F. A. MORTON.
COMBINATION BEET AND GRAIN DUMP RACK.
APPLICATION FILED AUG. 19, 1918.
1,315,386.
Patented Sept. 9, 1919.
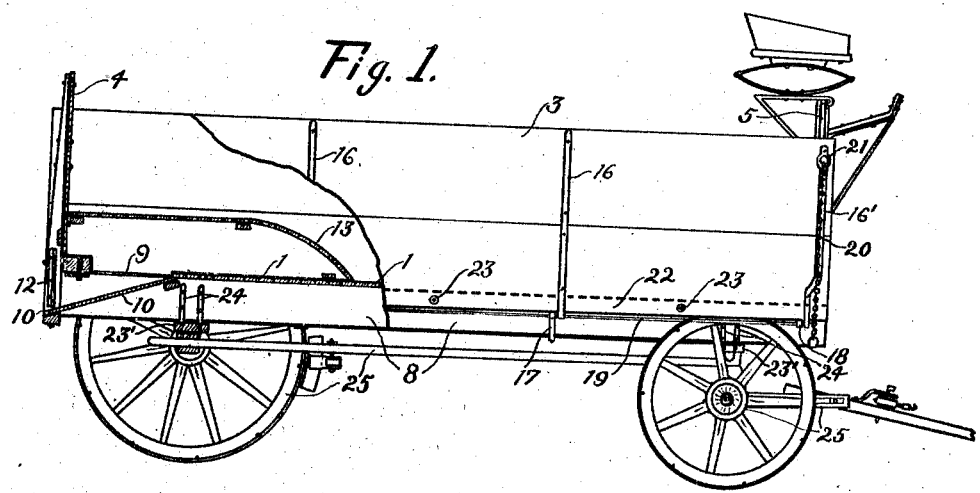
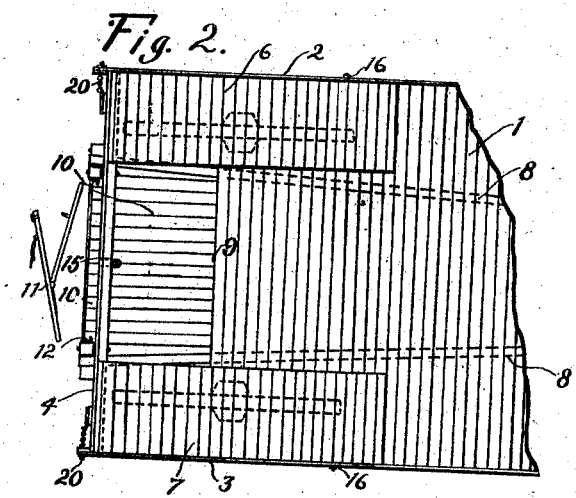
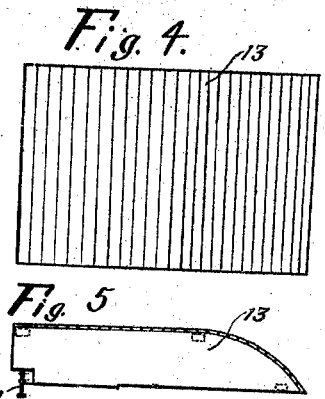
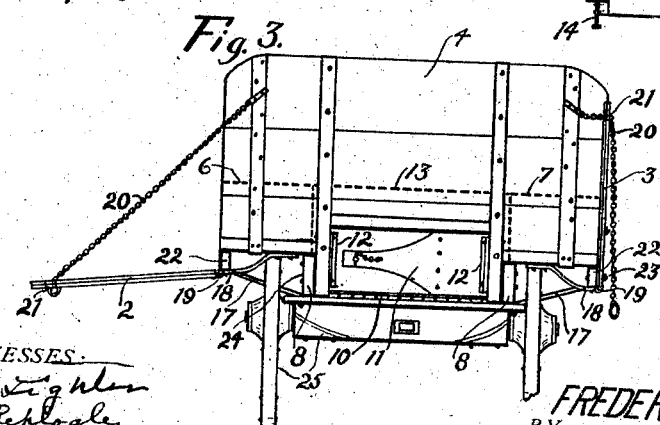
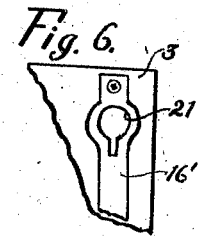

UNITED STATES PATENT OFFICE.

FREDERICK A. MORTON, OF TIMNATH, COLORADO.

COMBINATION BEET AND GRAIN DUMP RACK.

1,315,386.  Specification of Letters Patent.  Patented Sept. 9, 1919.

Application filed August 19, 1918. Serial No. 250,490.

*To all whom it may concern:*

Be it known that I, FREDERICK A. MORTON, a citizen of the United States, residing at Timnath, in the county of Larimer and State of Colorado, have invented a new and useful Combination Beet and Grain Dump Rack, of which the following is a specification.

My invention relates to racks or boxes for wagons adapted for use in hauling sugar beets or similar loads and also in hauling loose grain, and relates to wagon racks that may be dumped either to the side or at the end. My invention is intended especially for the combination of use for a sugar beet rack in hauling beets to dumps or factory as applied in Colorado and other sugar beet raising States, and also for a loose grain box for marketing un-sacked grain.

The objects of the invention are to provide a strong and durable side dump beet rack which can be easily and conveniently converted into a rear dump grain tight box; also to provide details of construction insuring easy operation and simple conversion for either use.

These objects are attained by the construction illustrated in the accompanying drawing.

Figure 1 of the drawing is a side view or elevation of a combination rack constructed according to my invention; a portion of the back end of the rack is cut away showing the construction in longitudinal center section.

Fig. 2 is a plan or top view of the rear end of the rack, showing the collapsible end-gate removed.

Fig. 3 is a rear end view of the rack with one side opened into dumping position.

Fig. 4 is a top view or plan and Fig. 5 a side elevation of the false bottom.

Fig. 6 is an enlarged detail view of an eyelet strap on the rack sides for adjustable chain anchoring.

Throughout the several figures the same reference numerals refer to the same or like parts.

The rack is in the form of a box with floor 1, sides 2 and 3, rear end 4 and front end 5. Wheel housings 6 and 7 are built in at each side of the rear end of the box floor to allow the rack to be set as low as possible.

The entire floor of the rack, including the wheel house covering, is made of matched flooring or other tight fitting material. The floor is laid on the main sills 8 and side rails 22 along the sides, and is continuous from the front end of the rack back between the wheel housings to within a short distance from the rear end. At the back end between the housings an opening 9 is left in the floor, and a slanting grain chute 10 is provided under this opening and between the rear end of the sills 8. The grain chute 10 slants toward the rear and opens out under the rear end 4 of the rack. A closure at the lower end of the grain chute is provided by a tight fitting collapsible end-gate 11. End-gate 11 fits in behind L-irons or other suitable stops 12 at the sides of the chute opening.

A false bottom 13, having its top shaped the same as the tops of the wheel housings, is made to fit in and bridge the space between the wheel housings. False bottom 13 is made removable and when in place between the housings and over the grain opening to the grain chute is anchored by means of a bolt strap 14 secured to the false bottom and adapted to extend through and be anchored by a nut to an eye strap 15 on the cross beam at the rear end of the rack.

The rack sides 2 and 3 are hinged at their lower edges. The hinges are provided by loops in the lower ends of side straps 16 and 16' at the sides of the box and similar loops at the ends of brace straps 17 and 18 beneath the box, with a key rod 19 extending longitudinally through these loops.

20 are chains fastened to the front and rear ends of the rack and pass through holes near the upper corners of the rack sides. Opposite the chain holes in the sides the straps 16' have eyelets shaped as shown in Fig. 6 through which the chains extend. By dropping a chain link edgewise into the slit at the bottom of an eyelet 21 the hinged side may be held in any desired position.

The side rails 22 are securely braced by the straps 17 and 18; straps 17 extending downward under the sills and straps 18 at the ends bracing the rail to the cross beams as shown in Fig. 3. Temporary bolts 23 are provided to bolt the bottoms of sides 2 and 3 securely to the side rails 22 to insure grain tight joints when the rack is being used for hauling loose grain.

In order to securely anchor the sills to the bolsters 23', and also to make possible a convenient replacement of any broken anchor bolt, I use bolt-straps 24 bolted at the sides of the sills, as indicated in Fig. 1.

25 indicates generally the running gears of a wagon on which my combination rack may be used.

It will be understood that the usual method of dumping wagons at beet dumps is to tip the entire wagon and rack to one side; proper platforms for that purpose being provided at the dumps. And at grain mills and elevators provision is made whereby the rear end of a wagon may be lowered or the front end raised to accomplish the dumping of grain from an ordinary wagon box.

From the foregoing description and illustration it will be seen that one rack constructed according to my invention will permit of use either as a side dump beet rack or a rear dump grain box, without the necessity of having a separate beet rack and grain wagon box, and without the necessity of changing the rack for a grain box or the box for a rack on a set of running gears.

In use for loose grain hauling, the false bottom 13 is removed from the rack and the end-gate 11 is inserted and keyed into place. The hinged sides of the rack are closed up tight and anchored in place by chains 20; and, if necessary or desired, temporary bolts 23 are used to draw the bottoms of the sides firmly against the side rails 22, making the entire rack grain tight. To unload the wagon it is driven on the dumping platform, if such a platform is provided at the unloading station, with the back end of grain chute 10 over the receiving chute or bin. End-gate 11 is unkeyed and removed allowing the grain to spill out through the chute 10. By lowering the rear end of the wagon or raising the front end practically all of the grain will spill out through the chute, any remaining grain being easily shoveled through the opening 9 of the grain chute. Or, even if provision is not made for the tipping of the wagon, all the grain in the box is easily shoveled to and through the grain chute.

In using the rack for beet hauling, the false bottom 13 is placed in its position between the wheel housing and anchored fast by means of bolt strap 14 and eye strap 15. The end-gate 11 may be in position or not as it is not used. The temporary bolts 23 are removed to allow the rack sides to swing upon their hinges. In this condition the rack is ready for use in the usual manner for hauling sugar beets. The dumping of a load is accomplished by dropping one side to open position as shown at the left of Fig. 3 and tipping the wagon sidewise in the usual manner. The false bottom 13, by bridging the space between the wheel housings and covering the grain chute 10, prevents beets from becoming lodged either in the grain chute or between the housings.

It will be apparent that for low wheeled wagons and where no housings are necessary over the hind wheels of the wagon the false bottom 13 may be made and used to cover only the opening 9 to the grain chute, in such case there being no housings to bridge between.

I claim:

1. A combination rack of the class described having hinged drop sides for side dumping and a rear end chute for rear end dumping, said chute being arranged underneath an opening in the floor of the rack, with a false bottom adapted to close said floor opening.

2. A combination rack of the class described having hinged drop sides with anchor chains to hold said sides in open or closed position, a grain chute opening through the rack floor, with a false bottom adapted to be removably anchored over said opening, substantially as described.

3. In a rack of the class described having wheel housings at each side of the rear end of the rack, a grain chute under the rack floor between said housings slanting downward and backward and opening out under the rear end of the rack, an end gate adapted to close the lower end of said chute, said rack floor having an opening between said housings into said chute, with a false bottom adapted to fit in between said housings and cover said opening in the floor and completely bridge the space between said housings, substantially as described.

4. In a combination rack of the class described, a grain tight box rack with floor laid upon longitudinal sills and side rails, wheel housings at each side at the rear end of said rack floor, the sides of said rack being hinged along their lower edges to braces on the undersides of said side rails, anchor chains fastened to the ends of the rack and passing through eyelets near the upper corners of said sides to allow anchoring of said sides in open or closed position, bolts adapted to temporarily anchor the lower edges of said sides to said side rails when the sides are in closed position, a grain chute betwen the rear ends of said rack sills opening out under the rear rack end from an opening in the rack floor between said wheel housings, a collapsible end-gate adapted to close the lower end of said chute, and a removable false bottom adapted to fit in and bridge the space between said housings and close the floor opening to said chute, substantially as described.

FREDERICK A. MORTON.

Witnesses:
FRANK J. BURNETT,
CLARA O. COFFIN.